United States Patent
Kaminka et al.

(10) Patent No.: US 8,965,130 B2
(45) Date of Patent: Feb. 24, 2015

(54) FLEXIBLE COMPUTER VISION

(75) Inventors: Gal Kaminka, Kfar Saba (IL); Eran Sadeh-Or, Givataim (IL)

(73) Assignee: Bar-Ilan University, Ramat Gan (IL)

( * ) Notice: Subject to any disclaimer, the term of this patent is extended or adjusted under 35 U.S.C. 154(b) by 534 days.

(21) Appl. No.: 13/292,554

(22) Filed: Nov. 9, 2011

(65) Prior Publication Data

US 2012/0121130 A1    May 17, 2012

Related U.S. Application Data

(60) Provisional application No. 61/344,899, filed on Nov. 9, 2010.

(51) Int. Cl.
    *G06K 9/46*     (2006.01)
    *G06K 9/00*     (2006.01)

(52) U.S. Cl.
    CPC .................... *G06K 9/4671* (2013.01)
    USPC .......................................... 382/195; 382/103

(58) Field of Classification Search
None
See application file for complete search history.

(56) References Cited

U.S. PATENT DOCUMENTS

| | | | | |
|---|---|---|---|---|
| 5,579,444 | A * | 11/1996 | Dalziel et al. | 700/259 |
| 6,711,293 | B1 | 3/2004 | Lowe | |
| 8,165,401 | B2 * | 4/2012 | Funayama et al. | 382/190 |
| 8,189,945 | B2 * | 5/2012 | Stojancic et al. | 382/264 |
| 8,538,077 | B2 * | 9/2013 | Zitnick, III | 382/103 |
| 8,582,889 | B2 * | 11/2013 | Vaddadi et al. | 382/195 |
| 8,625,902 | B2 * | 1/2014 | Baheti et al. | 382/190 |
| 2005/0213818 | A1 * | 9/2005 | Suzuki et al. | 382/190 |
| 2009/0238460 | A1 * | 9/2009 | Funayama et al. | 382/181 |
| 2009/0324087 | A1 * | 12/2009 | Kletter | 382/195 |
| 2010/0080469 | A1 * | 4/2010 | Liu et al. | 382/201 |
| 2010/0303354 | A1 * | 12/2010 | Reznik | 382/168 |
| 2010/0310174 | A1 * | 12/2010 | Reznik | 382/190 |
| 2011/0194772 | A1 * | 8/2011 | SanJuan et al. | 382/190 |
| 2011/0293187 | A1 * | 12/2011 | Sarkar et al. | 382/190 |
| 2011/0299770 | A1 * | 12/2011 | Vaddadi et al. | 382/165 |
| 2012/0027290 | A1 * | 2/2012 | Baheti et al. | 382/154 |

(Continued)

OTHER PUBLICATIONS

"Real-time Image Processing for Motion Planning based on Realistic Sensor Data," Kai Wetzelsberger et al, 2010 IEEE International Workshop on Robotic and Sensors Environments (ROSE), Date of Conference: Oct. 15-16, 2010, pp. 1-6.*

(Continued)

*Primary Examiner* — Wenpeng Chen
(74) *Attorney, Agent, or Firm* — Symbus Law Group, LLC; Clifford D. Hyra

(57) ABSTRACT

Methods and apparatus for image matching using local features, in particular a method and apparatus for flexible interest point computation. The method involves producing multiple octaves of a digital image, wherein each octave of said multiple scale octaves comprises multiple layers; initiating a process comprising detection and description of interest points, wherein said process is programmed to progress layer-by-layer over said multiple layers of each of said multiple octaves, and to continue to a next octave of said multiple octaves upon completion of all layers of a current octave of said multiple octaves; upon the detection and the description of each interest point of said interest points during said process, recording an indication associated with said interest point in a memory, such that said memory accumulates indications during said process; and upon interruption to said process, returning a result being based at least on said indications.

22 Claims, 6 Drawing Sheets

(56) References Cited

U.S. PATENT DOCUMENTS

| | | | |
|---|---|---|---|
| 2012/0109993 A1* | 5/2012 | Reznik | 707/765 |
| 2012/0201466 A1* | 8/2012 | Funayama et al. | 382/195 |
| 2012/0281872 A1* | 11/2012 | Zitnick, III | 382/103 |
| 2013/0135301 A1* | 5/2013 | Marimon Sanjuan et al. | 345/420 |

OTHER PUBLICATIONS

Table of content of ICRA 2011 conference proceeding, 2011, 39 pages.*

Bay H, Tuytelaars T and Gool LV. SURF: speeded up robust features. In Computer Vision—ECCV 2006, pp. 404-417. 2006.

Evans C. Notes on the OpenSURF library. Technical report, University of Bristol, Jan, pp. 1-25. 2009.

Mikolajczyk K and Schmid C. A performance evaluation of local descriptors. Pattern Analysis and Machine Intelligence, IEEE Transactions on, 27(10):1615-1630, 2005.

Tuytelaars T and Mikolajczyk K. Local invariant feature detectors: a survey. Foundations and Trends in Computer Graphics and Vision 3(3): 177-280, 2008.

Zilberstein S. Using anytime algorithms in intelligent systems. AI Magazine, 17(3): 73-83, 1996.

Bay et al., (2008) Speeded-Up Robust Features (SURF). Computer Vision and Image Understanding 110 (2008) 346-359.

* cited by examiner

FLEXIBLE COMPUTER VISION

CROSS REFERENCE TO RELATED APPLICATIONS

This application claims the benefit of U.S. Provisional Patent Application No. 61/344,899, filed Nov. 9, 2010 and entitled "AnySURF: Flexible Local Features Computation", the entirety of which is incorporated herein by reference.

FIELD OF THE INVENTION

The invention relates to flexible computer vision.

BACKGROUND OF THE INVENTION

The use of computer vision in autonomous robotics has been studied for decades. Recently, applications such as autonomous vehicle navigation [5], 3D localization and mapping [17, 6, 3] and object recognition [16] have gained popularity, likely due to the increase in available processing power, new algorithms with real-time performance and advancements in high quality, low-cost digital cameras. These factors contribute to the ability of autonomous robots to perform complex, real-time, tasks using visual sensors.

Such applications are often based on a local feature (also "interest point") matching algorithm, which finds feature correspondences between two images. In recent years, there has been an increase in research on algorithms that use local, invariant features (for a survey see [23, 19]). These features are usually invariant to image scale and rotation and also robust to changes in illumination, noise and minor changes in viewpoint. In addition, these features are usually distinctive and easy to match against a large database of local features.

Image matching using local features has been in use for almost three decades. The term "interest point" was first introduced by Moravec in 1979 [20], who later proposed the use of a corner detector for stereo matching [21]. The Moravec detector was improved by Harris and Stephens [10], who used it for efficient motion tracking and 3D structure from motion recovery [9]. The Harris corner detector has since been used widely for many other image matching tasks.

Although extensively used, the Harris corner detector is claimed to be very sensitive to changes in image scale, so it does not provide a good basis for matching images of different sizes. There are many works that deal with representations that are stable under scale change, dating back to 1983 when Crowley and Parker [4] developed a representation that identified peaks and ridges in scale space and linked these into a tree structure which could be matched between images of different scales. More recently, Lindeberg conducted a comprehensive study of this problem [14] and suggested a systematic approach to feature detection with automatic scale selection [15].

A decade ago, Lowe [16] introduced the Scale Invariant Feature Transform (SIFT), which had a significant impact on the popularity of local features. SIFT descriptors are invariant to a substantial range of affine distortion, changes in a 3D viewpoint, noise and illumination differences. Robust matching is possible between different views of an object or a scene, in the presence of clutter and occlusion. Since when SIFT was published, several new algorithms inspired by SIFT have emerged, including PCA-SIFT [12], GLOH [18] and SURF [1].

SURF (Speeded-Up Robust Feature) [1], which is incorporated herein by reference in its entirety, is a state of the art algorithm for local invariant feature matching—a scale and rotation invariant interest point detector and descriptor. SURF is composed of three major steps, similar to SIFT, but uses faster feature detection/extraction algorithms. SURF is known to be faster to compute than SIFT, while allowing for comparable results.

SUMMARY OF THE INVENTION

There is provided, in accordance with an embodiment, a method for flexible interest point computation, comprising: producing multiple octaves of a digital image, wherein each octave of said multiple scale octaves comprises multiple layers; initiating a process comprising detection and description of interest points, wherein said process is programmed to progress layer-by-layer over said multiple layers of each of said multiple octaves, and to continue to a next octave of said multiple octaves upon completion of all layers of a current octave of said multiple octaves; upon the detection and the description of each interest point of said interest points during said process, recording an indication associated with said interest point in a memory, such that said memory accumulates indications during said process; and upon interruption to said process, returning a result being based at least on said indications.

There is further provided, in accordance with an embodiment, an apparatus comprising: a digital imaging device; a processing unit configured to: produce multiple octaves of a digital image, wherein each octave of said multiple scale octaves comprises multiple layers; initiate a process comprising detection and description of interest points, wherein said process is programmed to progress layer-by-layer over said multiple layers of each of said multiple octaves, and to continue to a next octave of said multiple octaves upon completion of all layers of a current octave of said multiple octaves; upon the detection and the description of each interest point of said interest points during said process, record an indication associated with said interest point in a memory, such that said memory accumulates indications during said process; and upon interruption to said process, return a result being based at least on said indications.

In some embodiments, said indications comprise interest point descriptors computed in said description; and said returning of the result comprises matching said interest point descriptors with predetermined, comparative interest point descriptors, and returning a result of said matching.

In some embodiments, said process further comprises matching interest point descriptors computed in said description with predetermined, comparative interest point descriptors; and said indication comprises an indication of a match determined in the matching.

In some embodiments, the method further comprises producing multiple octaves of a comparative digital image, wherein each octave of said multiple octaves of said comparative digital image comprises multiple layers, wherein said detection and description of interest points by said process comprises detection and description of interest points also in said multiple octaves of said comparative digital image, and wherein said process further comprises matching interest point descriptors of said digital image and of said comparative digital image computed in said description, and wherein said indication comprises an indication of a match determined in the matching.

In some embodiments, the method further comprises producing multiple octaves of a comparative digital image, wherein each octave of said multiple octaves of said comparative digital image comprises multiple layers, wherein said detection and description of interest points by said process comprises detection and description of interest points also in said multiple octaves of said comparative digital image, wherein said indications comprise interest point descriptors of said digital image and of said comparative digital image computed in said description, and wherein said returning of the result comprises matching said interest point descriptors of said digital image with said interest point descriptors of said comparative digital image, and returning a result of said matching.

In some embodiments, the method further comprises computing an integral image of said digital image.

In some embodiments, said process is further programmed to progress from a finest octave of said multiple octaves towards a most coarse octave of said multiple octaves.

In some embodiments, said process is further programmed to progress from a most coarse octave of said multiple octaves towards a finest octave of said multiple octaves.

In some embodiments, the method further comprises computing a homography between said digital image and a comparative digital image.

In some embodiments, the method further comprises a stereoscopy of said digital image and of a comparative digital image.

In some embodiments, said process further comprises computing a Hessian matrix for each octave of said multiple octaves.

In some embodiments, said processing unit is further configured to produce multiple octaves of a comparative digital image, wherein each octave of said multiple octaves of said comparative digital image comprises multiple layers, wherein said detection and description of interest points by said process comprises detection and description of interest points also in said multiple octaves of said comparative digital image, and wherein said process further comprises matching interest point descriptors of said digital image and of said comparative digital image computed in said description, and wherein said indication comprises an indication of a match determined in the matching.

In some embodiments, said processing unit is further configured to produce multiple octaves of a comparative digital image, wherein each octave of said multiple octaves of said comparative digital image comprises multiple layers, wherein said detection and description of interest points by said process comprises detection and description of interest points also in said multiple octaves of said comparative digital image, wherein said indications comprise interest point descriptors of said digital image and of said comparative digital image computed in said description, and wherein said returning of the result comprises matching said interest point descriptors of said digital image with said interest point descriptors of said comparative digital image, and returning a result of said matching.

In some embodiments, said processing unit is further configured to compute an integral image of said digital image.

In some embodiments, the apparatus further comprises a mechanical actuator, wherein said processing unit is further configured, upon interruption to said process, to transmit a control signal based on said result to said mechanical actuator.

In some embodiments, said mechanical actuator is selected from the group consisting of: a robotic arm, a motor configured to drive a vehicle and a motor configured to drive a conveyor belt.

There is further provided, in accordance with an embodiment, a method for flexible object recognition, comprising: receiving predetermined data being visually characteristic of one or more objects; receiving a digital image; initiating an analysis of said digital image through consecutive application of filters of different magnitudes to said digital image, to produce, during each filter application of said consecutive applications, at least one indication of correspondence between said digital image and said one or more visual objects; and interrupting said analysis on demand, and providing a result comprising said at least one indication of correspondence.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
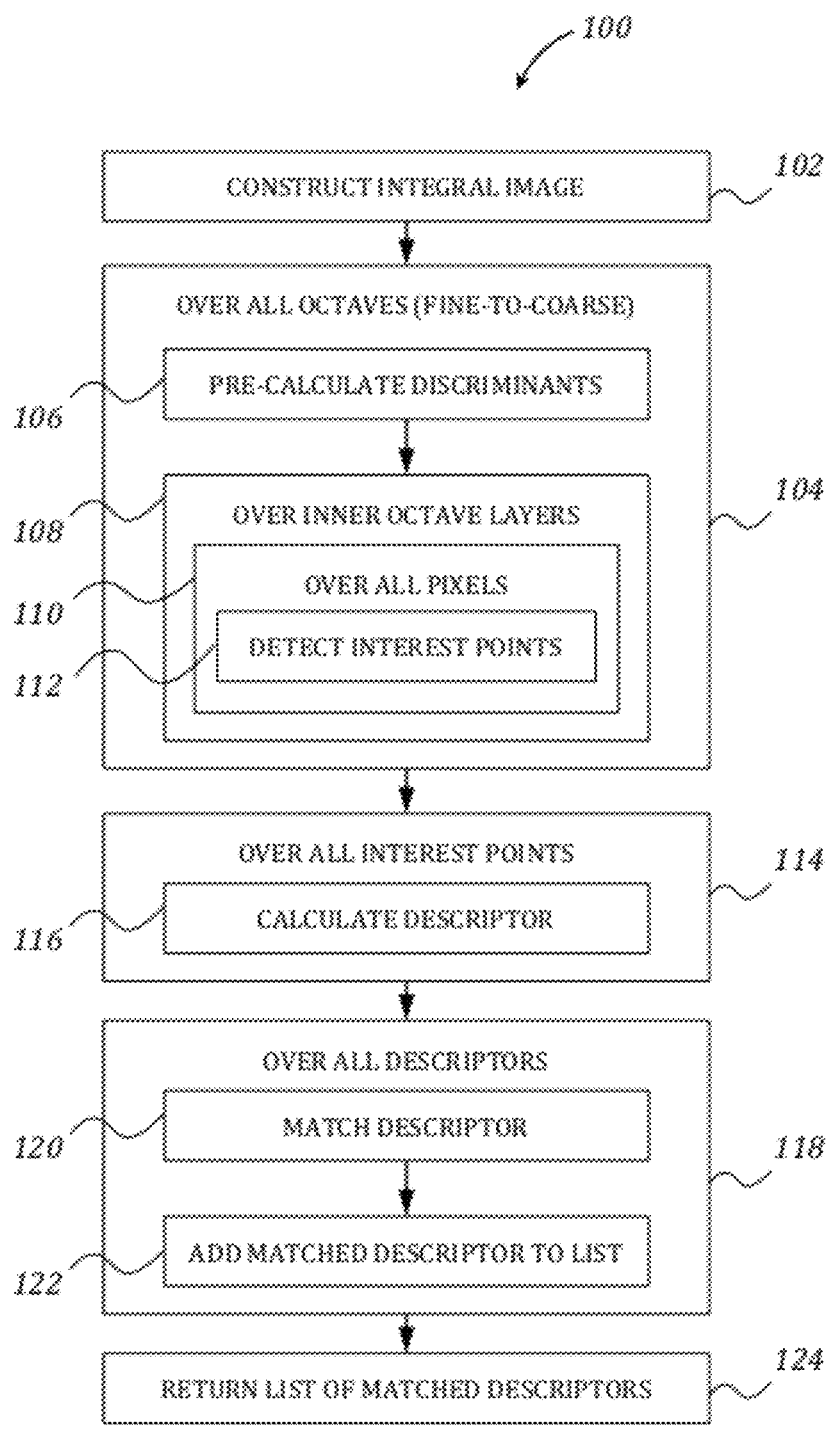
FIG. 1 shows a flow chart with some of the main steps of the SURF algorithm.

An aspect of some embodiments relates to a flexible ("anytime") algorithm for vision-based interest point detection and description. Advantageously, the algorithm may provide a result, even partial, no matter if the allocated run time is sufficient for a complete analysis. That is, the flexibility of the algorithm enables a trade-off between run time and the quality of the result, which increases as the amount of allocated run time increases.

For many object recognition applications, whether in robotics or in other fields, even partial results—a subset of all features in the image—may be useful or even advantageous over complete but slower results.

Many existing algorithms for feature matching, such as [1, 17, 18], are designed under the assumption that they will run to completion and only then return a complete result. Such algorithms, therefore, require significant computational resources to run in real-time. This prohibits them from being used in many current object recognition and robotic platforms, where computation power is limited. For instance, in experiments conducted by the inventors, a NAO[H21] and a NAO[T12] humanoid robots (by Aldebaran Robotics, Paris, France), computing the full set of features in an image sized 640×480 pixels required approximately 2.4 seconds using a state-of-the-art implementation of the SURF algorithm [1, 22]. The present flexible algorithm, in contrast, may be suitable for platforms of different computing powers without the need to adapt it especially for the platform. For example, if results for a certain task are required after an X amount of milliseconds, the present algorithm may be implemented, as-is, on different platforms, and simply instructed to stop at X milliseconds. It will then return a partial but still useful result, which only differs in the number of features found; that is, on stronger platforms, the number of features will be larger, while on weaker platforms it may be smaller, but nonetheless useful. Non-anytime algorithms, in contrast, may not return any useful result if interrupted before completion.

The term "partial" result(s), in this regard, should be differentiated from the term "complete" or "full" result(s); whereas the term "partial" results relates to a readily-available list of feature descriptors of any length, even of a single feature, "complete" or "full" results refers to a list of feature descriptors yielded after a complete, uninterrupted run of the present flexible algorithm, which covered all aspects of an image.

In many scenarios, having to wait for complete results to be calculated may harm or even frustrate the very purpose of the object recognition task. For example, if a moving robot cannot get information about an en route obstacle on time, it may fail to avoid hitting that obstacle. Similarly, if a product inspection system fails to deduce whether a product moving past it is in proper condition, it may miss a faulty product or, in contrast, cause a proper product to be discarded.

Still, being able to invest computation time in getting higher-quality results may be important in some scenarios, such as in recognizing certain objects or in building accurate maps. Many applications of object recognition may benefit from a computationally-flexible algorithm, where the computation time is traded for the accuracy requirements of the task. To do this, simply interrupting the algorithm when needed is not enough; it must be guaranteed that the results of the algorithm would necessarily increase in quality given additional computation time. This class of algorithms is referred to in the art as "Anytime" [26], "computationally-flexible" or simply "flexible". SIFT and SURF, for example, were not designed as anytime algorithms.

Embodiments of the present disclosure, therefore, relate to an anytime feature matching algorithm, configured to accumulate results iteratively, with quality which increases in time. The feature matching may be aimed at identifying matching (or "corresponding") features ("interest points" or "visual objects") between two digital images, and/or between predetermined data characterizing certain features (the data being, for example, a list of feature descriptors) and a digital image.

In some embodiments, the anytime feature-matching algorithm is partly based on SURF, in which there is very little overhead for working with specific scales or areas due to computing an integral image once for all scales and only changing the filter size when working on each scale. Flexibility is achieved, inter alia, by re-designing several major steps of the SURF algorithm [1], mainly the feature search process and the order of interest point detection.

The anytime feature-matching algorithm may be executed by any computing platform, where one or more digital imaging devices provide digital images to be analyzed in the platform. Other than general-use computers (such as personal computers), the anytime feature-matching algorithm may be especially suitable for operating on a specialized-hardware platform, such as a robotic device, a manned or unmanned vehicle (whether aerial, terrestrial, space-usable, marine or sub-marine), a gaming platform, an augmented reality platform, a smart phone and/or the like. Such platforms may utilize the algorithm's abilities and flexibility for vision-based tasks such as navigation, mapping, pose estimation, robotic movement, etc.

Additional platform which may benefit from using the anytime feature-matching algorithm include surveillance systems, in which the algorithm may detect and analyze changes and motion, generate optical flow, etc., survey systems, in which the algorithm may be used for scene reconstruction, and medical imaging, where it may help estimate various changes and motion. In the industrial inspection field, the anytime feature-matching algorithm may be useful for inspecting various items produced, such as products transported along a conveyor belt and undergoing visual inspection before packaging. On smart phones equipped with a camera, the anytime feature-matching algorithm may enhance certain operations involving real-time object recognition, such as optical character recognition (OCR) applications, augmented reality applications, image-based web searches, etc.

In object recognition applications, where the goal may be to find one or more specific objects in a digital image or in multiple images, the anytime feature-matching algorithm may receive, as input, predetermined data which visually characterizes the specific object(s). For example, the data may include one or more descriptors of each of the specific object(s). Additional input is a digital image, in which finding of the object(s) is desired. The algorithm then runs, searching, through consecutive application of filters of different magnitudes, for corresponding features that may facilitate the locating of the object(s). Indications of correspondence are collected during the application of filters, such that, when the algorithm is interrupted, a result indicative of the correspondence is provided.

Reference is now made to FIG. 1, which shows a flow chart highlighting some of the main steps of the SURF algorithm 100. Initially, to reduce computation time along the algorithm, an integral image is constructed 102 based on an input image (or images). An integral image is an image representation which may be quickly computed from an input image and speeds up the calculation of an upright rectangular area of any size [24]. An integral image $I_\Sigma$ of image I at point (x, y) is defined as the sum of pixel intensities of the rectangular region formed between the point and the origin. Formally, it is defined as:

$$I_\Sigma(x, y) = \sum_{i=0}^{i \leq x} \sum_{j=0}^{j \leq y} I(x, y)$$

With $I_\Sigma$ calculated, it only takes four additions to calculate the sum of the intensities over any upright, rectangular area, independent of its size SURF makes use of this property to perform fast convolutions of varying sizes of box filters at near constant time.

After the integral image is constructed, interest points are detected 112, a descriptor is calculated 116 for every interest point, and the descriptors are matched 120.

More specifically, the detection of interst points 112 starts with scale-space extrema detection. First, the discriminant of a Hessian matrix is pre-calculated 106 for each octave 104, over the entire image, as the exemplary Pan-o-matic [22]. OpenSURF [7] and OpenCV [2] SURF implementations dictate.

The Hessian matrix, H, is the matrix of partial derivatives of the function $f$ $$H(f(x, y)) = \begin{bmatrix} \frac{\partial^2 f}{\partial x^2} & \frac{\partial^2 f}{\partial x \partial y} \\ \frac{\partial^2 f}{\partial x \partial y} & \frac{\partial^2 f}{\partial y^2} \end{bmatrix}$$

The discriminant, determinant of this matrix, is:

$$\det(H) = \frac{\partial^2 f}{\partial x^2} \frac{\partial^2 f}{\partial y^2} - \left(\frac{\partial^2 f}{\partial x \partial y}\right)^2$$

The discriminant is used to find a local extremum of the function, via the second order derivative test. If the discriminant is positive then either both eigenvalues are positive or both are negative and so the point is classified as an extremum. Using this theory on images means that $f(x,y)$ is the image pixel intensity at $I(x,y)$. In order to calculate derivatives, a convolution with an appropriate kernel can be used. SURF uses the Gaussian second order derivatives, approximated via box filters.

Scale-space is a continuous function which can be used to find extrema across scales [25]. Scale-space is usually divided into a number of "octaves", with each octave containing a number of layers, which are response maps covering a doubling of scale SURF 100 creates scale-space efficiently by applying kernals of increasing size to the original image, with the processing time being size invariant and without a need to sub-sample the image.

A search over all inner octave layers 108 and their pixels 110 is then performed, using an approximation of the Hessian matrix, to identify potential interest points that are invariant to scale and rotation. Calculation of the Hessian approximation relies on the integral image, to reduce computation time. Interest points are first thresholded so that all values below a predetermined threshold are removed, then a non-maximal suppression is performed to find candidate points (each pixel is compared to its 26 neighbors, comprised of the 8 points in the native scale and 9 in each of the scales above and below) and, finally, they are localized in both scale and space by fitting a 3D quadratic.

The next step, namely—the calculation of the interest point descriptors 116 for all interest points 114, is based on a distribution of Haar-wavelet responses within the interest point neighborhood, again relying on integral images for speed. The SURF descriptor describes how the pixel intensities are distributed within a scale-dependent neighborhood around each detected interest point. It is calculated by first assigning a repeatable orientation via Haar wavelet responses weighted with a Gaussian centered at the interest point, followed by constructing a square-oriented window around the interest point, divided into 4×4 regular sub-regions. For each sub-region, four Haar wavelets responses are summed up ($d_x$, $d_y$, $|d_x|$, $|d_y|$), so that a vector of length 4×4×4=64 is produced.

Matching 120 of corresponding descriptors within all the descriptors 118 calculated is done via the Euclidean distance of their feature vectors. A fast nearest-neighbor algorithm is used, which performs this computation rapidly against large databases. SURF uses the sign of the Laplacian (the trace of the Hessian matrix) to distinguish bright features on dark background from the reverse situation. Since SURF's descriptor uses 64 dimensions, time for feature computation and matching is reduced. The matched descriptors are added to a list 122, and when the algorithm concludes all computation, the list of the matched descriptors is returned 124.

Figure 2:
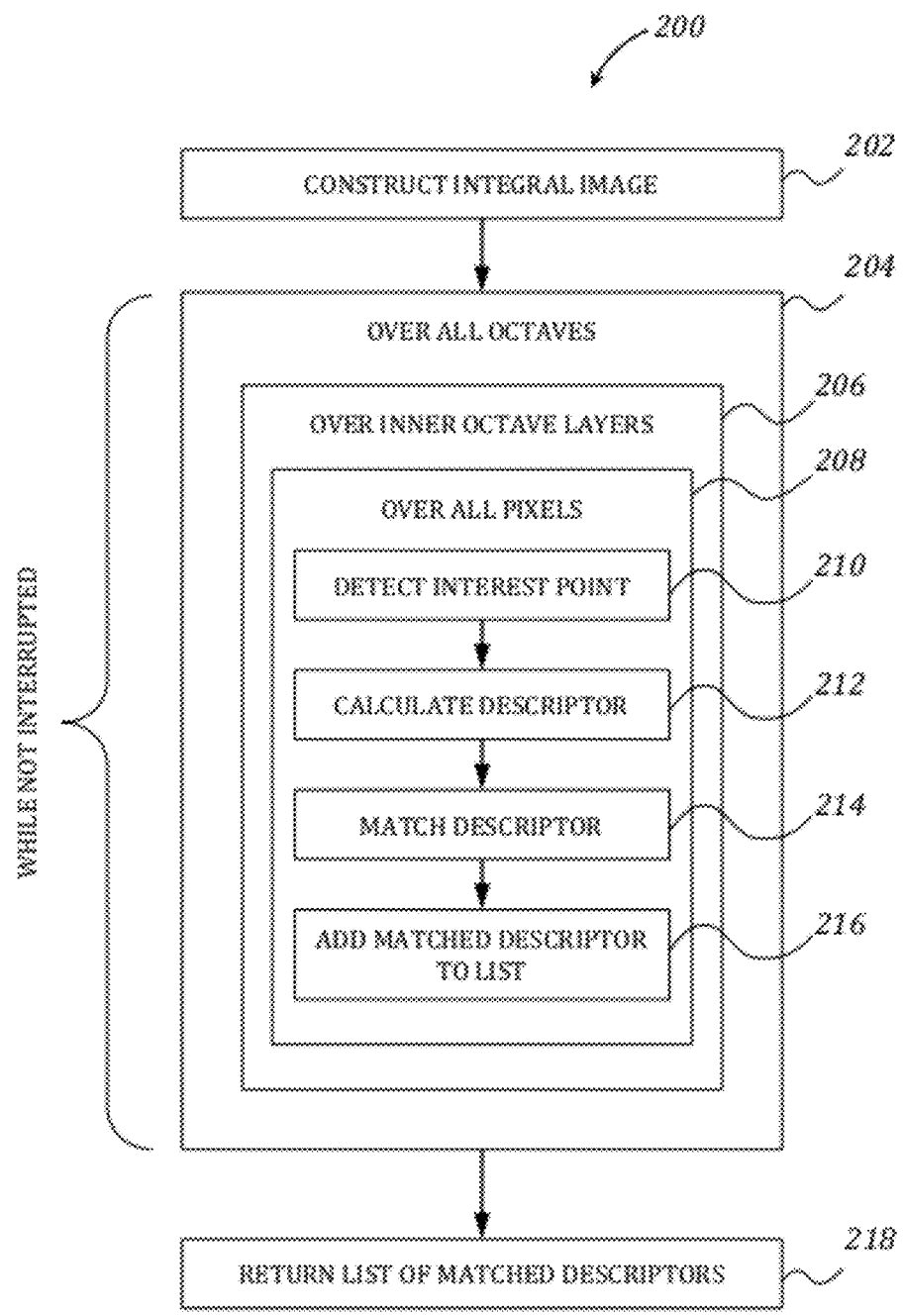
FIG. 2 shows a flow chart of an anytime feature-matching algorithm.

Reference is now made to FIG. 2, which shows a flow chart of an anytime interest point computation algorithm (or simply "anytime algorithm") 200, in accordance with an embodiment. Generally, anytime algorithm 200 is based upon iterative accumulation of results. SURF 100 (FIG. 1), in contrast, divides the work to several large consecutive steps (get all interest points from all octaves, compute descriptors for all interest points, match all descriptors against database) and so, if the final stage is not reached due to earlier interruption—there may be no useful results, not even partial.

Contrary to this "batch" approach of SURF 100 (FIG. 1), anytime algorithm 200 uses an iterative approach, where results are accumulated during execution of the algorithm and are returned when the algorithm is interrupted. Anytime algorithm 200 achieves this aim by computing a partial result in each iteration. Firstly, an integral image of an input digital image is optionally constructed 202, to reduce future calculation time. Alternatively, a different computationally-economic representation of the input digital image may be constructed.

Then, anytime algorithm 200 initiates a process programmed to analyze the integral image (or the digital image, if no integral image was constructed) through consecutive application of filters of different magnitudes. The term "programmed to" is used here since the process is not likely to run to completion, even so it is programmed to do so if needed. For example, filters of different magnitudes may include working with different scale representations of the integral image, often referred to as "octaves", which are, in turn, divided into "octave layers" (or simply "layers"). That is, a search over all pixels of a layer 208, octave layer by octave layer 206, octave by octave 204 may be conducted, to detect interest points 210, calculate their descriptors 212 and record—after each descriptor is calculated—suitable indications associated with the interest points in a list 216 saved in memory. The indications may be, for example, the descriptors themselves. When the process is interrupted, whether by an external signal or as pre-scheduled, anytime algorithm 200 may return list 216, which may also be referred to as a "result". Optionally, matching of descriptors 212 may be conducted upon the interruption, and a result of the matching is returned. As yet another option, the matching of descriptors 212 may be conducted during the aforementioned process, namely—matching is attempted following the computation of each descriptor. When a match is determined, a suitable indication may be recorded in the memory, instead of the aforementioned indications being the descriptors.

Each iteration, accordingly, may be defined as one algorithm pass over all pixels of one inner layer of one octave. During this pass, partial results may be returned on demand 218, in the form of the list of descriptors which has just been updated with the new descriptor computed in the particular pass, or in the form of the match indications which have been similarly updated. If anytime algorithm 200 is interrupted during a pass, it returns the results up to the previous pass.

As discussed above, the feature matching may be aimed at identifying matching features between two digital images (which may be referred to as an "original" and a "comparative" images), and/or between a predetermined, comparative list of feature descriptors and a digital image. The former case may be applicable, for example, to robots that need to constantly analyze imagery data recorded by their cameras in order to perform certain tasks, avoid obstacles etc.; anytime algorithm 200, in such cases, may be used to repeatedly compare pairs of consecutively-recorded images. The latter case, in which the comparison is against a predetermined list, may be applicable, by way of example, in cases where a repeated process requires comparison of different products, scenes and/or the like against a certain "template" or "model" (the comparative, pre-determined list), for which a list of descriptors has already been calculated.

As mentioned, detection of interest points 210 may be done by searching the entire image in multiple octaves. According to SURF 100 (FIG. 1), this search usually starts with the smallest kernel and continues with applying kernels of increasing size to the image. Since anytime algorithm 200 accumulates results iteratively, the order of the search may have implications on the speed of the algorithm at different periods of its run. By allowing different search strategies in anytime algorithm 200, the search may be tailored to the characteristics of the task at hand.

In some embodiments, two types of general search strategies are provided: Coarse-to-Fine and Fine-to-Coarse. Coarse-to-Fine refers to starting with the largest, most coarse filter size and continuing with smaller and smaller filter sizes up to the finest one, so that larger features are found first and smaller ones later, while Fine-to-Coarse means the exact opposite. Note, that if the anytime algorithm 200 runs to completion, the search order does not matter and exactly the same features are found.

In some embodiments, the search strategy may also be based on changing the order of going over inner octave layers 206 and/or the order of going over pixels 208.

Selecting an appropriate search strategy according to the task and its associated image types (for example, typically blurry images) may maximize the number of features detected during the early phase of the search, and therefore, a relatively early interruption to the search will provide relatively good results. However, sometimes the number of features is not what is sought to be optimized. For example, some computer vision tasks work better when the features have a good spatial distribution over the image (for example, homography calculation [11]) or when coarse features are first matched and only then fine features are searched for in a limited area to complete the match (for example, object recognition [16]). In such cases, it may be more beneficial to use Coarse-to-Fine search, even if the initial number of features is smaller when compared to the Fine-to-Coarse strategy.

Some of the major SURF implementations (Pan-o-matic [22], OpenSURF [7], OpenCV [2]) pre-calculate the determinant of Hessian (discriminant) for each octave, over the entire image 104 (FIG. 1). Although this step has a high initial computational cost, once calculated, results are faster to compute so the total running time is lower.

In anytime algorithm 200, however, which is an algorithm not likely to run to completion, this high initial computational cost may not be worthy. In some embodiments, therefore, the determinant of Hessian may be computed in-place, namely—when analyzing each octave. In these embodiments, not only initial response time is improved, but also space is saved; pre-calculating the determinant of Hessian requires several 2D arrays to be kept in memory. The SURF implementations mentioned above [22, 7, 2] use arrays the size of a full image to simplify coding (however, smaller arrays can be used).

Since multiple layers exist, each defined by an image width and height (layers x image_width x image_height), multiple arrays may be saved in memory, each the size of a full image. For large images or platforms with little memory available, this can be quite problematic. In accordance with some embodiments, therefore, since the determinant of Hessian is calculated in-place, there is no need to save multiple arrays in memory. This makes anytime algorithm 200 especially suitable for low-memory applications.

In different embodiments, however, a variant of anytime algorithm 200 does use pre-calculation of the determinant of Hessian. The total computation time of this variant is shorter (if the algorithm runs to completion), yet first results are generated much later since pre-calculation has a high initial computational cost, as discussed above. This variant may be suitable for applications where no results are needed during an initial time period of the run time, and the algorithm is usually interrupted only later on, after the pre-calculation ended and results start accumulating.

Figure 10:
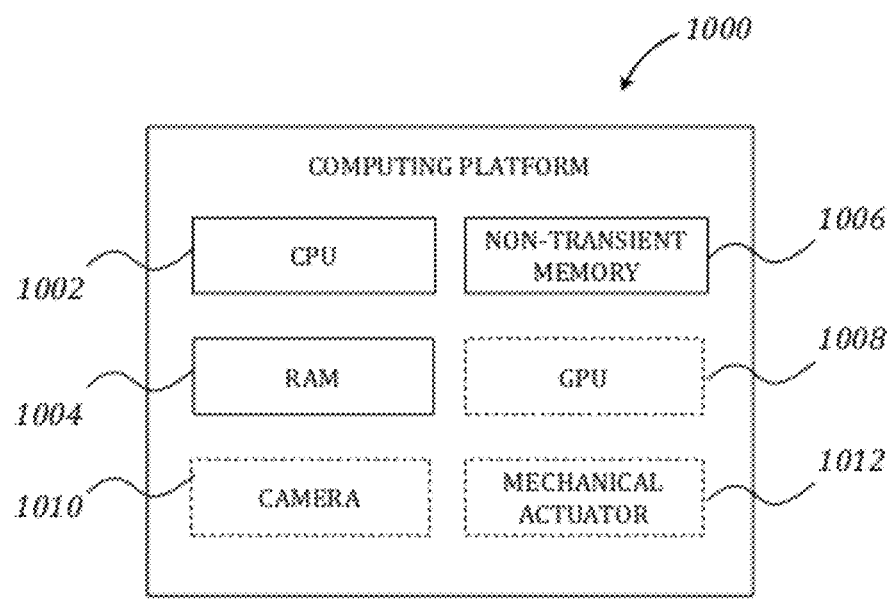
FIG. 10 shows a block diagram of a computerized platform configured to execute the anytime feature-matching algorithm.

Reference is now made to FIG. 10, which shows a block diagram of an exemplary apparatus—a computerized platform (hereinafter "platform") 1000. Platform 1000 incorporates at least a central processing unit 1002 (CPU), a temporary memory such as Random Access Memory 1004 (RAM) and a computer-readable medium or article such as a non-transient memory 1006, all three jointly referred to herein as a "processing unit". Non-transient memory 1006 stores a set of instructions that, when executed by CPU 1002, cause the CPU to perform anytime algorithm 200 (FIG. 2) and/or other operations in accordance with present embodiments. The computer-readable medium or article may include, for example, any type of disk including a floppy disk, an optical disk, CD-ROM, a read-only memory (ROM), a random access memory (RAM), flash memory, an electrically programmable read-only memory (EPROM), an electrically erasable and programmable read only memory (EEPROM), or any other type of media suitable for storing computer instructions, and capable of being coupled to a computer system bus. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, such as C, C++, C#, Java, BASIC, Pascal, Fortran, Cobol, assembly language, machine code, and/or the like.

Digital imagery input to platform 1000 may be provided by one or more optional digital imaging devices, such as a digital camera 1010 of platform 1000 or in association with the platform.

In addition to CPU 1002, platform 1000 optionally includes a Graphic Processing Unit 1008 (GPU), a specialized microprocessor that may offload, and hence accelerate, graphic-related rendering from CPU 1002. In the presence of GPU 1008, at least some of the operations of anytime algorithm 200 (FIG. 2) are performed by the GPU instead of by CPU 1002.

Additionally or alternatively, platform 1000 may be wholly or partially substituted by a digital signal processor (DSP), a field-programmable gate array (FPGA) and/or an application-specific integrated circuit (ASIC), being configured to store and execute instructions of anytime algorithm 200 (FIG. 2). For example, CPU 1002, RAM 1004, non-transient memory 1006 and GPU 1008 may be substituted by the DSP, FPGA and/or ASIC.

Following execution of anytime algorithm 200 (FIG. 2) and the provisioning of results, a control signal may be transmitted, for example from CPU 1002, to a mechanical actuator 1012 which is optionally provided in platform 1000 or is externally connected to it. The term "mechanical actuator", as referred to herein, relates to any physical means configured to apply a technical effect to an object and/or towards the environment. Merely as examples, the mechanical actuator may be an electric motor driving an unmanned vehicle, a motor or a set of motors controlling movement of a robot or of a part thereof (such as a robotic arm), an electric motor configured to drive a conveyor belt in a factory, etc.—all acting responsive to the results of anytime algorithm 200 (FIG. 2).

Unless specifically stated otherwise, it is appreciated that terms such as "processing", "computing", "calculating", "determining", "analyzing", "searching", "applying" or the like, which appear in discussions of present embodiments throughout the specification, refer to the action and/or process of a computerized platform such as platform 1000 or a similar electronic computing device that manipulates and/or transforms data represented as physical, such as electronic, quantities within the computing system's registers and/or memories into other data similarly represented as physical quantities within the computing system's memories, registers or other such.

EXPERIMENTAL RESULTS AND EXAMPLES

Anytime algorithm 200 has been evaluated in a series of experiments. The experiments demonstrate that non-anytime feature matching indeed suffers from significant computation time on limited platforms (including, in particular, the Nao humanoid robot). The experiments also enabled comparing different design choices for anytime algorithm 200, and analysis of its performance profile given different image types. The usability of anytime algorithm 200 has also been demonstrated in computing approximate homography.

Table 1 shows computation time on multiple platforms for the same image in different sizes (QVGA: 320×240 pixels, VGA: 640×480 pixels, 3MP: 2048×1536 pixels). Evaluation was done using Pan-o-matic open-source SURF implementation [22] with default parameters, which produces very similar results compared to the published SURF binary [8] to which source code is not available. As may easily be seen in Table 1, as the platform weakens, computation time increases, sometimes taking whole seconds or even minutes.

TABLE 1

SURF detector-descriptor computation time
(ms) on different image sizes and platforms

| Platform | QVGA | VGA | 3MP |
| --- | --- | --- | --- |
| Desktop PC (Intel Q9400 2.66 GHz) | 27 | 103 | 1021 |
| Mini-ITX (Intel T7200 2.0 GHz) | 74 | 249 | 1599 |
| Nao Robot (x86 AMD GEODE 500 MHz) | 560 | 2425 | 26367 |
| Nokia N900 (ARM Cortex-A8 600 MHz) | 938 | 3656 | 442512 |

It is clear that in order to run a real-time, full-image feature search with SURF, one has to work on a small resolution image coupled with a powerful platform. If a larger image and/or a weaker platform are used, the idle time until results from SURF are received may render it unsuitable for applications, such as robotic ones, which require very fast response time, or, in other words, require real-time operation.

In addition, in this experiment the CPU (Central Processing Unit) and memory were devoted entirely to the SURF process, while in robotic or other applications additional non-vision tasks might also require processing time and memory usage (localization, mapping, motion generation, behavior selection, etc.).

Table 2 shows where the processing time is spent across the different major steps of SURF. The Intel Q9400 platform was selected for this test, to eliminate as many bottlenecks as possible and allow the optimal behavior of the algorithm show.

TABLE 2

Analysis of SURF detector-descriptor computation
time (ms) on Intel Q9400 2.66 GHz

| Image size | Integral image | Interest point detectors | Interest point descriptors |
| --- | --- | --- | --- |
| QVGA | 1 (3.7%) | 19 (70.4%) | 7 (25.9%) |
| VGA | 3 (2.9%) | 80 (77.7%) | 20 (19.4%) |
| 3MP | 32 (3.1%) | 910 (89.1%) | 79 (7.8%) |

As can be seen in Table 2, calculation of the integral image is almost negligible (~3.2%) and detection of interest points occupies most of the time (~79%). In the context of a flexible algorithm, namely—anytime algorithm 200, since detecting interest points takes most of the time, it may be beneficial to calculate the descriptor immediately upon interest point detection, thus significantly shorten the time until results, even partial, are available.

An analysis of the impact of the various design choices of anytime algorithm 200 is now presented, supported by experimental data. The image database used in these experiments is a standard evaluation set, provided by Mikolajczyk [18] at http://lear.inrialpes.fr/people/mikolajczyk/Database/de-t_eval.html, and incorporated herein by reference in its entirety. It contains 48 digital images across 8 different scenes. All images are of medium resolution (approximately 800×640 pixels) and are either of planar scenes or the camera position is fixed during acquisition, so that in all cases, all images of a scene are related by homographies (plane projective transformations). Each scene includes a sequence of images that present different imaging conditions: viewpoint changes, scale changes, image blur, JPEG compression and illumination changes.

Figure 3:
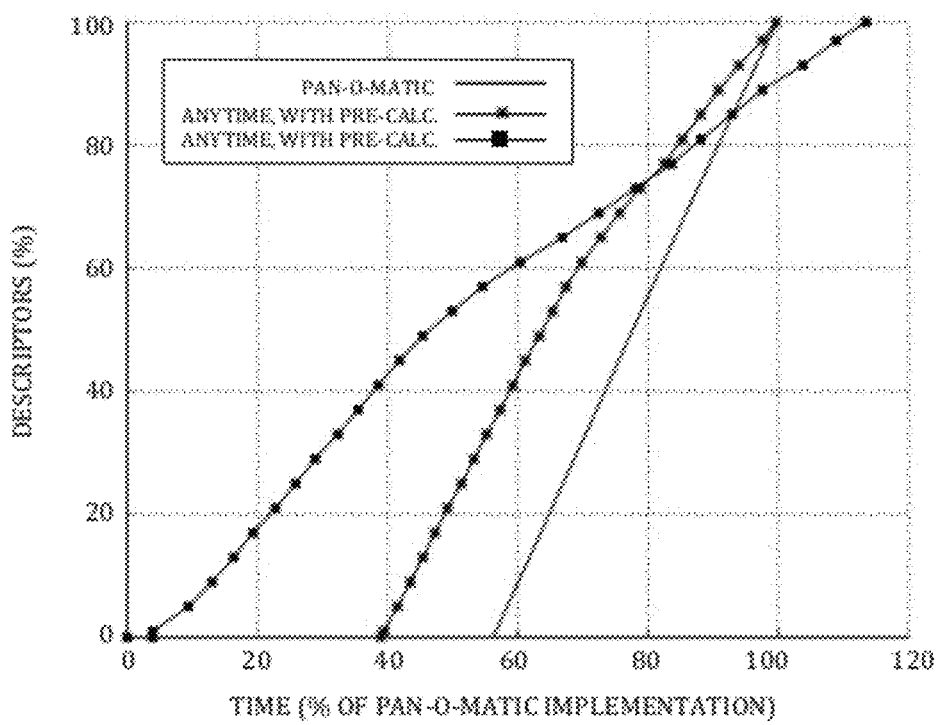
FIG. 3 shows a graph of an average rate of acquiring descriptors as a function of run time of the anytime feature-matching algorithm.

FIG. 3 shows a graph of the average rate of acquiring descriptors (%) as a function of run time (%) of anytime algorithm 200 (FIG. 1). Data was averaged across all 48 database images. Time is compared to Pan-o-matic [22] time, which is represented by a value of 100% (it is therefore possible for time to exceed 100%). Three alternatives are considered. First, the SURF implementation called Pan-o-matic. This implementation first detects all interest points at all scales and only then calculates descriptors. In addition, the determinant of Hessian is pre-calculated. Next, two variants of anytime algorithm 200 (FIG. 2) were tested, where descriptors are computed immediately upon interest point detection. In the first variant, pre-calculation of the determinant of Hessian is used and in the other it is calculated in-place.

As seen in FIG. 3, calculating the descriptors in-place appears to be beneficial compared to the original Pan-o-matic approach, since it does not adversely affect the total computation time, while allowing results to start accumulating earlier (after 39% of time passed instead of 57% in Pan-o-matic). Without pre-calculation, although the algorithm does take longer than Pan-o-matic to complete (13.5% more on average), results are being received almost immediately (after 4% of time passed), with a near-linear acquire rate. Accordingly, pre-calculation may be useful when all descriptors are needed or when it can be assumed that anytime algorithm 200 (FIG. 2) will run to near completion; the anytime algorithm with pre-calculation supersedes the no pre-calculation variant after 80% of the time passed.

Figure 4:
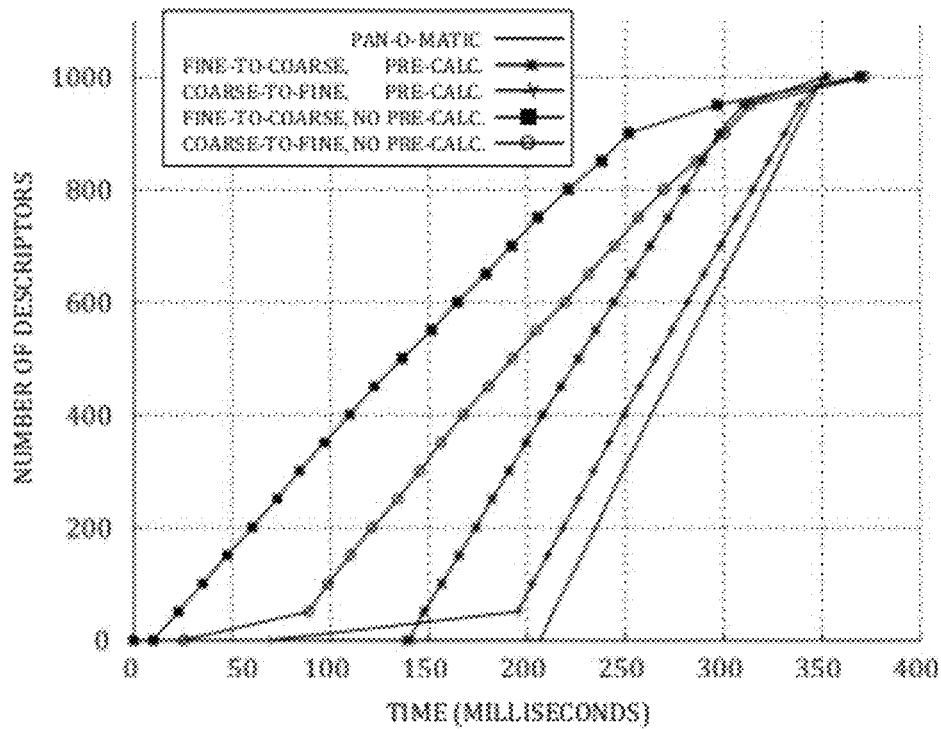
FIG. 4 shows a graph of the number of descriptors as a function of run time of the anytime feature-matching algorithm, applied to an image showing bricks.
Figure 5:
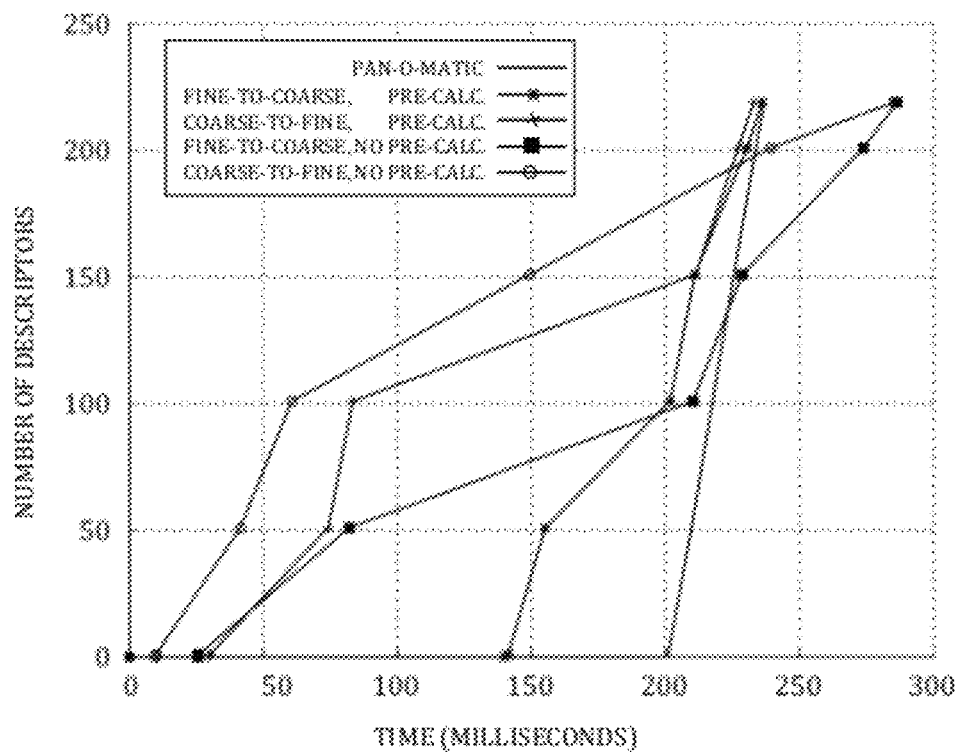
FIG. 5 shows a graph of the number of descriptors as a function of run time of the anytime feature-matching algorithm, applied to an image showing bikes.

Next, the impact of the search strategy has been determined through experimentation. As discussed above, since anytime algorithm 200 (FIG. 2) accumulates results iteratively, an order of the search for interest points may be selected. FIGS. 4 and 5 are graphs relating to specific images of the database, namely—the first image of the "bricks" scene and the fourth image of the "bikes" scene, respectively, showing the number of descriptors as a function of run time. Four combinations are shown: with/without pre-calculation, Coarse-to-Fine/Fine-to-Coarse search strategy, compared to Pan-o-matic as a baseline.

In FIG. 4, the Fine-to-Coarse search strategy produces results much faster than Coarse-to-Fine, while in FIG. 5, the opposite is true. In both figures, however, results both start sooner and accumulate faster. In addition, the difference in number of descriptors is significant, up to an order of magnitude (see, for example, at approximately 30 ms). In conclusion, the search strategy in anytime algorithm 200 may be adapted to the task at hand. Even more, the different search strategies may be automatically experimented with during the run of anytime algorithm 200, to determine, without manual user guidance, which one is likely to be more efficient for the present task. Once determined, anytime algorithm 200 may continue running with the better strategy. As for the use of pre-calculation of the descriptors, it appears that for anytime algorithm 200, in-place calculation is generally superior. However, in FIG. 5, the pre-calculated (Coarse-to-Fine) version defeats the in-place (Fine-to-Coarse) version. This stresses, again, that selecting an appropriate search strategy may be highly beneficial when selecting the correct search strategy for the task at hand, the no pre-calculation (Coarse-to-Fine) version triumphs again, at least until most of the descriptors are found, as discussed above.

Figure 6:
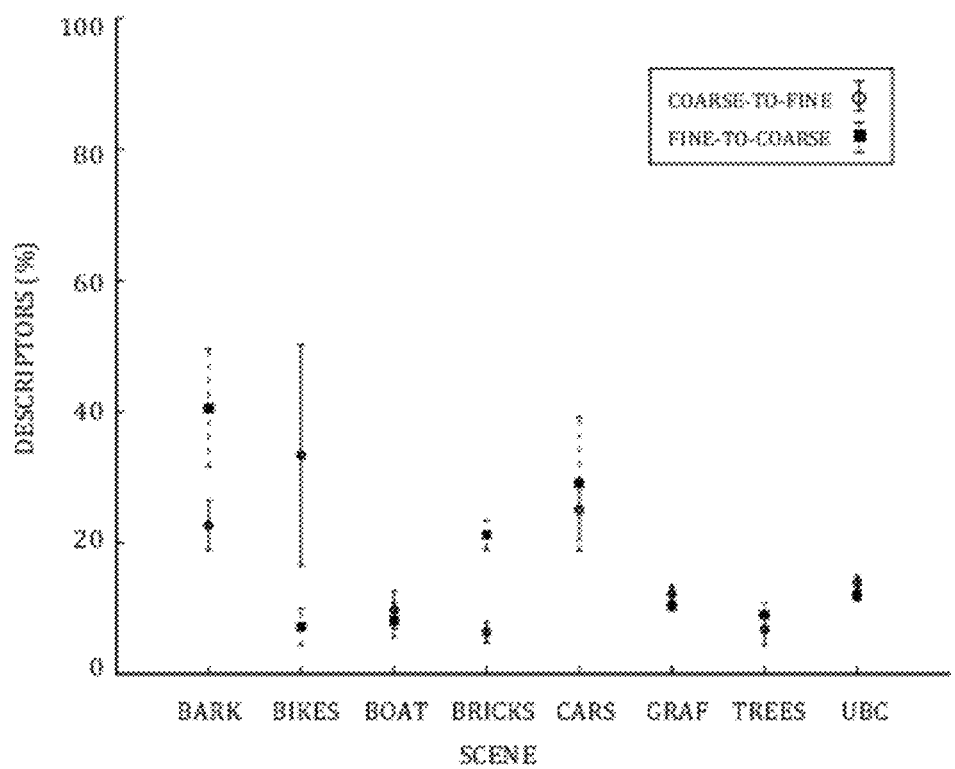
FIG. 6 shows a graph of the effect of search strategy in different scenes on the first 50 ms of the anytime feature-matching algorithm.

After witnessing a major difference in the specific database images discussed above according to the chosen search strategy, further experimentation has been made to evaluate how the Fine-to-Coarse vs. Coarse-to-Fine search strategies perform in the full image database, across the different scenes. The results are shown in FIG. 6, which illustrates the effect of search strategy in different scenes on the first 50 ms of anytime algorithm 200 of FIG. 2 (without pre-calculation of the descriptors). The circle (coarse-to-fine) and rectangle (fine-to-coarse) markers represent the mean percentage of descriptors computed for each scene, and the vertical error bars are two standard deviation units in height.

Figure 8:
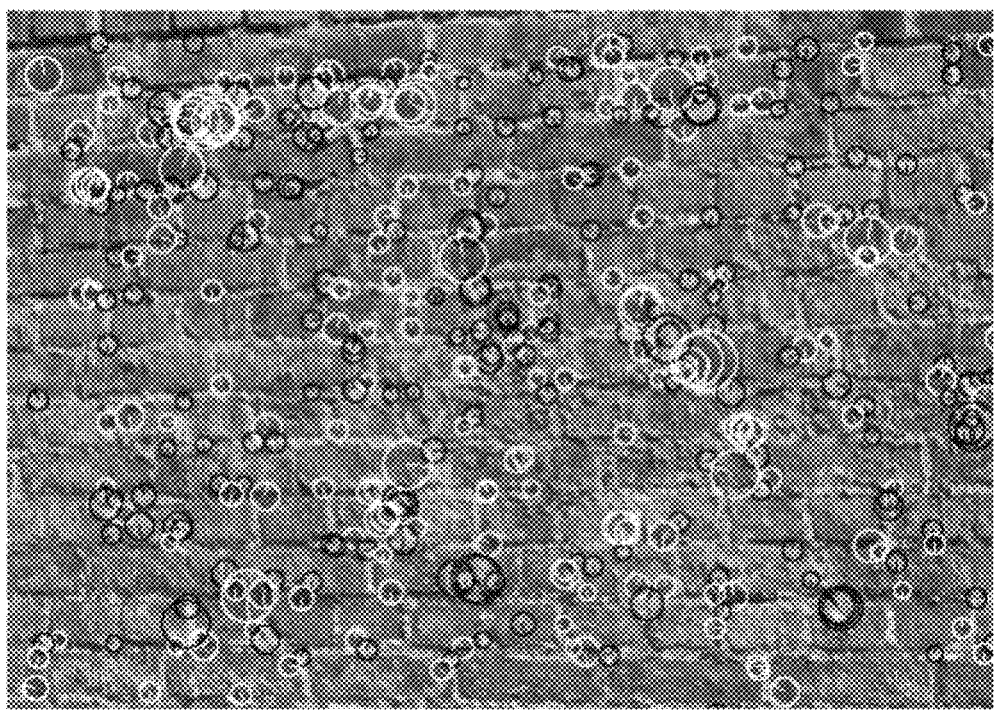
FIG. 8 shows a picture of bikes with interest points marked.
Figure 9:
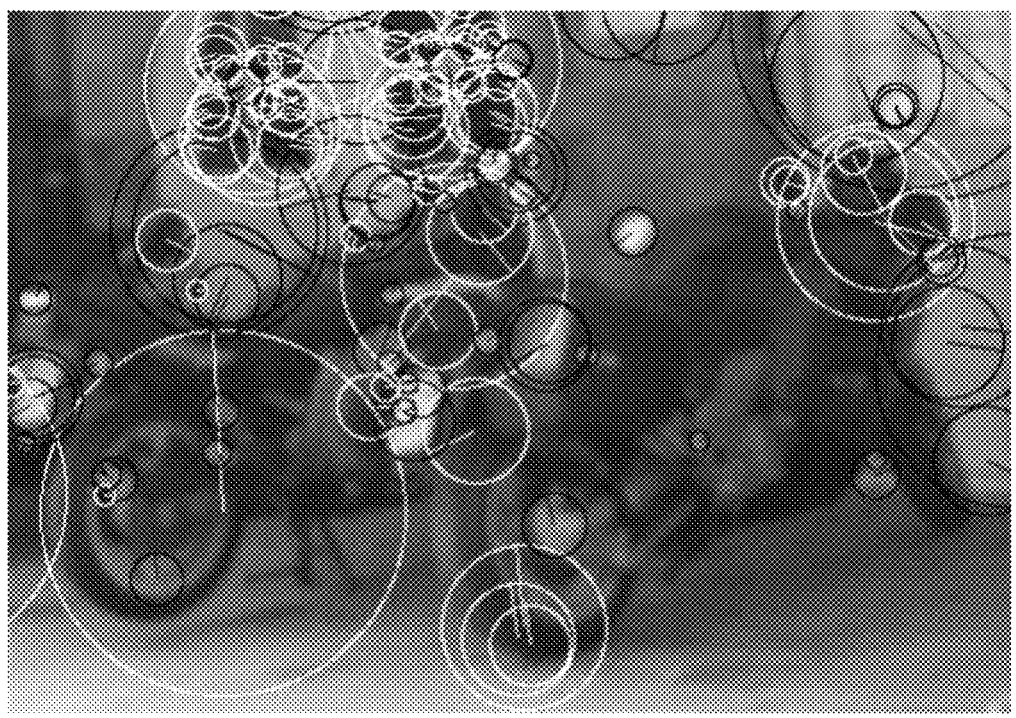
FIG. 9 shows a picture of bricks with interest points marked.

This figure demonstrates that it is beneficial to select the appropriate search strategy according to the type of image at hand, if the number of descriptors is to be optimized. The image sequences "bark" and "bricks" are clearly more suited for a Fine-to-Coarse search whereas "bikes" is more suited for a Coarse-to-Fine search. The underlying reason appears to be that "bikes" is a sequence of blurred images, so there are less fine features and processing time is wasted on searching for them (see FIG. 8), while "bark" and "bricks" contain images with many fine features and few coarse ones (see FIG. 9).

It should also be noted that between 5% to 40% of all descriptors may be acquired within the first 50 ms, with higher percentages being usually possible for images with a lower total number of descriptors and a lower total computation time, and vice versa. The average number of descriptors acquired after 50 ms on the present image database is 119 for Coarse-to-Fine and 138 for Fine-to-Coarse.

Figure 7:
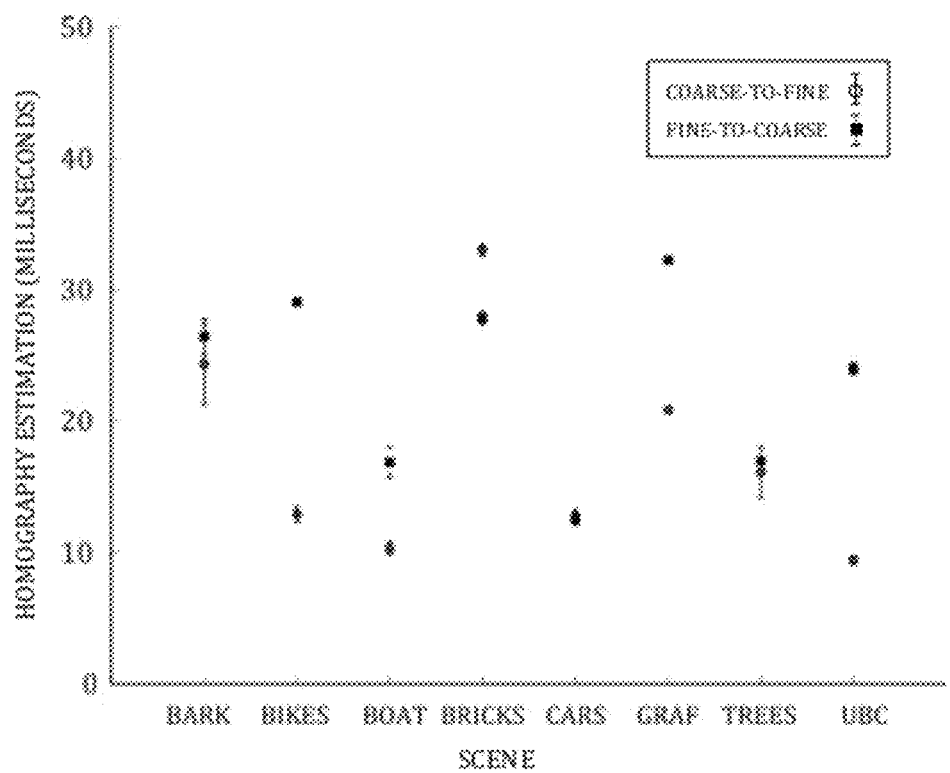
FIG. 7 shows a graph of the time to estimate homography between a first and a second image in each of multiple scenes.

Fast acquisition of a higher number of descriptors may not be the aim in all types of task. For example, coarse features are generally larger, fewer and usually more spread over the image so they might suit some tasks better than fine features. One such task is homography estimation [11]. FIG. 7 shows a graph of the time that passed until homography between the first and second images in each scene was estimated (to within an order of magnitude from the optimal value). Homography was calculated via the RAN SAC approach [11, 13].

FIG. 6 demonstrates that coarse features enable quicker homography estimation compared to fine features. The Coarse-to-Fine search strategy took equal or less time to estimate the homography in most scenes (7 out of 8) and more time in just one scene (the "bricks" scene, which contains very few coarse features and so, a lot of time is wasted searching for coarse features). The results for the "bark", "cars" and "trees" scenes do not differ significantly, while results for others do (two-tailed t-test, p=0.01). It was also observed that the homography can be estimated within a very short time (~20 ms).

Homography estimation may also serve as a catalyst in the execution of anytime algorithm 200 (FIG. 2) for various other embodiments. If homography between two images is discovered early on in the execution, such as when a relatively small number of interest points have been matched, the homography may be used to predict where additional interest points may be located. By way of example, if after 12 matches homography can be established at a level of confidence which was pre-defined as sufficient, then the rest of the search may be conducted such that when an interest point is found at a certain location in a first image, a search in a homographically-related area of a second image is immediately conducted, instead of progressing according to the originally programmed search. Naturally, this may greatly expedite the process of matching.

Furthermore, the use of homography to expedite the matching may be done in parallel to a search being conducted systematically, layer by layer, octave by octave. That is, in a platform adapted for parallel computing (such as a multiple-core processor and/or multiple processors), separate threads may be used for the homography estimation and the systematic search; upon establishment of homography, the thread performing the systematic search may be directed to cease its operation and proceed with a more directed search, where interest points are looked for in areas related by the homography.

Similarly, estimation of interest point location may be conducted using visual feature tracking methods known in the art. Generally, this may include an assumption that if the two digital images were taken at two very close times, interest points are likely to remain in approximately the same areas in the two images. Hence, when an interest point is found in a first image, the search over a second image may be directed to approximately the same coordinates as the interest point already found. Again, this may be done by utilizing parallel computing.

Similar to homography, anytime algorithm 200 (FIG. 2) may also be advantageous in computing a stereoscopy of two digital images. Stereoscopy refers to a technique for creating an illusion of depth in an image, by presenting two offset images—one to the left eye and one to the right eye of the viewer. The images may be stereo-matched using matching of features existing in both of them.

Finally, the use of anytime algorithm 200 (FIG. 2) on the NAO robot platform has been evaluated. Using SURF, estimating a homography between two images on this platform took on average 4 seconds (averaged across all images in database, similar to FIG. 6). This processing time was spent not on estimating the homography itself, but on computing all descriptors in the image. However, for estimating a homography, a subset of the results may suffice, and therefore anytime algorithm 200 (FIG. 2) may be used. Using anytime algorithm 200 (FIG. 2), this task was completed within 0.33 seconds, faster by an order of magnitude. Additionally, this homography may even assist in computing the remaining descriptors faster, since their location is may now be mathematically estimated and, therefore, the search across the image may be focused on these locations. Since the homography is just an estimation, limits may be set on an error margin of this focused search, and/or a minimum number of matches required may be set.

In the description and claims of the application, each of the words "comprise" "include" and "have", and forms thereof, are not necessarily limited to members in a list with which the words may be associated.

REFERENCES

[1] H. Bay, T. Tuytelaars, and L. V. Gool. SURF: speeded up robust features. In *Computer Vision—ECCV* 2006, pages 404-417. 2006.

[2] G. Bradski. The OpenCV library. Dr. Dobb's Journal of Software Tools, 2000.

[3] D. Chekhlov, M. Pupilli, W. Mayol-cuevas, and A. Calway. Realtime and robust monocular SLAM using predictive multi-resolution descriptors. *In 2nd International Symposium on Visual Computing*, 2006.

[4] J. L. Crowley and A. C. Parker. *Representation for Shape based on Peaks and Ridges in the Difference of Low-pass Transform.* 1983.

[5] DARPA. DARPA grand challenge. http://www.darpa.mil/grandchallenge/index.asp, 2007.

[6] A. Davison, I. Reid, N. Molton, and O. Stasse. MonoSLAM: Real-Time single camera SLAM. *Pattern Analysis and Machine Intelligence, IEEE Transactions on*, 29(6): 1052-1067, 2007.

[7] C. Evans. Notes on the OpenSURF library. *Technical report, University of Bristol, January* 2009.

[8] D. Gossow, D. Paulus, and P. Decker. An evaluation of open source SURF implementations. *In RoboCup 2010: Robot Soccer World Cup XIV.* 2010.

[9] C. Harris. Geometry from visual motion. In Active vision, pages 263-284. MIT Press, 1993.

[10] C. Harris and M. Stephens. A combined corner and edge detector. pages 151, 147, Manchester, 1988.

[11] R. Hartley and A. Zisserman. *Multiple View Geometry in Computer Vision.* Cambridge University Press, 2 edition, April 2004.

[12] Y. Ke and R. Sukthankar. PCA-SIFT: a more distinctive representation for local image descriptors. *null*, 2:506-513, 2004.

[13] P. D. Kovesi. MATLAB and Octave functions for computer vision and image processing. http://www.csse.uwa.edu.au/~pk/Research/MatlabFns, 2000.

[14] T. Lindeberg. *Scale-Space Theory in Computer Vision.* Kluwer Academic Publishers, 1994.

[15] T. Lindeberg. Feature detection with automatic scale selection. *Int. J Comput. Vision*, 30(2):79-116, 1998.

[16] D. G. Lowe. Object recognition from local Scale-Invariant features. *In Proceedings of the International Conference on Computer Vision—Volume* 2, page 1150. IEEE Computer Society, 1999.

[17] D. G. Lowe. Distinctive image features from ScaleInvariant keypoints. *International Journal of Computer Vision*, 60(2):91-110, November 2004.

[18] K. Mikolajczyk and C. Schmid. A performance evaluation of local descriptors. *Pattern Analysis and Machine Intelligence, IEEE Transactions on*, 27(10):1615-1630, 2005.

[19] K. Mikolajczyk, T. Tuytelaars, C. Schmid, A. Zisserman, J. Matas, F. Schaffalitzky, T. Kadir, and L. V. Gool. A comparison of affine region detectors. *Int. J. Comput. Vision*, 65(1-2):43-72, 2005.

[20] H. P. Moravec. *Visual Mapping by a Robot Rover.* 1979.

[21] H. P. Moravec. Rover visual obstacle avoidance. pages 785-790, Vancouver, British Columbia, August 1981.

[22] A. Orlinski. Pan-o-matic—automatic control point creator for hugin. http://aorlinsk2.free.fr/panomatic/.

[23] T. Tuytelaars and K. Mikolajczyk. Local invariant feature detectors: a survey. *Found. Trends. Comput. Graph. Vis.*, 3(3):177-280, 2008.

[24] P. Viola and M. Jones. Computer vision and pattern recognition, 2001. *CVPR 2001. proceedings of the 2001 IEEE, computer society conference on.* volume 1, pages 1-511-1-518 vol. 1, 2001.

[25] A. Witkin. Scale-space filtering: A new approach to multi-scale description. *In Acoustics, Speech, and Signal Processing, IEEE International Conference on ICASSP '84.*, volume 9, pages 150-153, 1984.

[26] S. Zilberstein. Using anytime algorithms in intelligent systems. *AI Magazine*, 17(3):73-83, 1996.

What is claimed is:

1. A method for flexible interest point computation, comprising:
    producing multiple octaves of a digital image, wherein each octave of said multiple scale octaves comprises multiple layers;
    initiating a process comprising detection and description of interest points, wherein said process is programmed to progress layer-by-layer over said multiple layers of each of said multiple octaves, and to continue to a next octave of said multiple octaves upon completion of all layers of a current octave of said multiple octaves;
    upon the detection and the description of each interest point of said interest points during said process, recording an indication associated with said interest point in a memory, such that said memory accumulates indications during said process; and
    upon interruption to said process, returning a result being based at least on said indications.

2. The method according to claim 1, wherein:
    said indications comprise interest point descriptors computed in said description; and
    said returning of the result comprises matching said interest point descriptors with predetermined, comparative interest point descriptors, and returning a result of said matching.

3. The method according to claim 1, wherein:
    said process further comprises matching interest point descriptors computed in said description with predetermined, comparative interest point descriptors; and
    said indication comprises an indication of a match determined in the matching.

4. The method according to claim 1, further comprising producing multiple octaves of a comparative digital image, wherein each octave of said multiple octaves of said comparative digital image comprises multiple layers,
    wherein said detection and description of interest points by said process comprises detection and description of interest points also in said multiple octaves of said comparative digital image, and
    wherein said process further comprises matching interest point descriptors of said digital image and of said comparative digital image computed in said description, and
    wherein said indication comprises an indication of a match determined in the matching.

5. The method according to claim 1, further comprising producing multiple octaves of a comparative digital image, wherein each octave of said multiple octaves of said comparative digital image comprises multiple layers, wherein said detection and description of interest points by said process comprises detection and description of interest points also in said multiple octaves of said comparative digital image, wherein said indications comprise interest point descriptors of said digital image and of said comparative digital image computed in said description, and wherein said returning of the result comprises matching said interest point descriptors of said digital image with said interest point descriptors of said comparative digital image, and returning a result of said matching.

6. The method according to claim 1, further comprising computing an integral image of said digital image.

7. The method according to claim 1, wherein said process is further programmed to progress from a finest octave of said multiple octaves towards a most coarse octave of said multiple octaves.

8. The method according to claim 1, wherein said process is further programmed to progress from a most coarse octave of said multiple octaves towards a finest octave of said multiple octaves.

9. The method according to claim 8, further comprising computing a homography between said digital image and a comparative digital image.

10. The method according to claim 1, further comprising a stereoscopy of said digital image and of a comparative digital image.

11. The method according to claim 1, wherein said process further comprises computing a Hessian matrix for each octave of said multiple octaves.

12. An apparatus comprising:
a digital imaging device;
a processing unit configured to:
  produce multiple octaves of a digital image, wherein each octave of said multiple scale octaves comprises multiple layers;
  initiate a process comprising detection and description of interest points, wherein said process is programmed to progress layer-by-layer over said multiple layers of each of said multiple octaves, and to continue to a next octave of said multiple octaves upon completion of all layers of a current octave of said multiple octaves;
  upon the detection and the description of each interest point of said interest points during said process, record an indication associated with said interest point in a memory, such that said memory accumulates indications during said process; and
  upon interruption to said process, return a result being based at least on said indications.

13. The apparatus according to claim 12, wherein:
said indications comprise interest point descriptors computed in said description; and
said return of the result comprises matching said interest point descriptors with predetermined, comparative interest point descriptors, and returning a result of said matching.

14. The apparatus according to claim 12, wherein:
said process further comprises matching interest point descriptors computed in said description with predetermined, comparative interest point descriptors; and
said indication comprises an indication of a match determined in the matching.

15. The apparatus according to claim 12, wherein said processing unit is further configured to produce multiple octaves of a comparative digital image, wherein each octave of said multiple octaves of said comparative digital image comprises multiple layers,
wherein said detection and description of interest points by said process comprises detection and description of interest points also in said multiple octaves of said comparative digital image, and
wherein said process further comprises matching interest point descriptors of said digital image and of said comparative digital image computed in said description, and
wherein said indication comprises an indication of a match determined in the matching.

16. The apparatus according to claim 12, wherein said processing unit is further configured to produce multiple octaves of a comparative digital image, wherein each octave of said multiple octaves of said comparative digital image comprises multiple layers,
wherein said detection and description of interest points by said process comprises detection and description of interest points also in said multiple octaves of said comparative digital image,
wherein said indications comprise interest point descriptors of said digital image and of said comparative digital image computed in said description, and
wherein said returning of the result comprises matching said interest point descriptors of said digital image with said interest point descriptors of said comparative digital image, and returning a result of said matching.

17. The apparatus according to claim 12, wherein said processing unit is further configured to compute an integral image of said digital image.

18. The apparatus according to claim 12, wherein said process is further programmed to progress from a finest octave of said multiple octaves towards a most coarse octave of said multiple octaves.

19. The apparatus according to claim 12, wherein said process is further programmed to progress from a most coarse octave of said multiple octaves towards a finest octave of said multiple octaves.

20. The apparatus according to claim 12 further comprising a mechanical actuator, wherein said processing unit is further configured, upon interruption to said process, to transmit a control signal based on said result to said mechanical actuator.

21. The apparatus according to claim 20, wherein said mechanical actuator is selected from the group consisting of: a robotic arm, a motor configured to drive a vehicle and a motor configured to drive a conveyor belt.

22. A method for flexible object recognition, comprising:
receiving predetermined data being visually characteristic of one or more objects;
receiving a digital image;
initiating an analysis of said digital image through consecutive application of filters of different magnitudes to said digital image, to produce, during each filter application of said consecutive applications, at least one indication of correspondence between said digital image and said one or more visual objects; and
interrupting said analysis on demand, and providing a result comprising said at least one indication of correspondence.

* * * * *